(12) United States Patent
Albrecht et al.

(10) Patent No.: US 7,715,137 B2
(45) Date of Patent: May 11, 2010

(54) SERVO PATTERNS FOR PATTERNED MEDIA

(75) Inventors: Thomas Robert Albrecht, San Jose, CA (US); Mario Blaum, San Jose, CA (US); Ksenija Lakovic, Menlo Park, CA (US); Bruce Alexander Wilson, San Jose, CA (US); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 665 days.

(21) Appl. No.: 11/584,408

(22) Filed: Oct. 19, 2006

(65) Prior Publication Data

US 2008/0094742 A1   Apr. 24, 2008

(51) Int. Cl.
*G11B 5/09* (2006.01)
(52) U.S. Cl. .......................................... 360/48; 360/40
(58) Field of Classification Search ................. None
See application file for complete search history.

(56) References Cited

U.S. PATENT DOCUMENTS

| | | | |
|---|---|---|---|
| 3,691,543 A | 9/1972 | Mueller | |
| 3,936,876 A | 2/1976 | Taylor | |
| 3,959,820 A | 5/1976 | Braun | |
| 4,238,809 A | 12/1980 | Fujiki et al. | |
| 4,390,910 A | 6/1983 | Wilson | |
| 4,418,368 A | 11/1983 | Nalley et al. | |
| 4,707,681 A | 11/1987 | Eggenberger et al. | |
| 4,984,100 A | 1/1991 | Takayama et al. | |
| 5,115,359 A | 5/1992 | Sidman | |
| 5,153,788 A | 10/1992 | Nishikawa et al. | |
| 5,274,510 A | 12/1993 | Sugita et al. | |
| 5,381,281 A | 1/1995 | Shrinkle et al. | |
| 5,596,460 A | 1/1997 | Greenberg et al. | |
| 5,600,499 A | 2/1997 | Acosta et al. | |
| 5,757,567 A | 5/1998 | Hetzler et al. | |
| 5,815,332 A | 9/1998 | Suzuki et al. | |
| 5,820,769 A | 10/1998 | Chou | |
| 5,949,358 A * | 9/1999 | Volz et al. .................... 341/102 |
| 6,018,304 A | 1/2000 | Bessios | |
| 6,049,438 A | 4/2000 | Serrano et al. | |
| 6,154,331 A | 11/2000 | Hanna | |

(Continued)

FOREIGN PATENT DOCUMENTS

JP          11224422 A   *   8/1999

(Continued)

OTHER PUBLICATIONS

Goddyn et al., "Gray Codes With Optimized Run Lengths," Utilitas Mathematica 34 (1988), 179-192.

(Continued)

*Primary Examiner*—Jason C Olson
(74) *Attorney, Agent, or Firm*—Darren Gold

(57) ABSTRACT

Servo patterns for patterned media. The servo pattern includes specification of cylinder/track ID with and without a Gray code. The servo pattern space is minimized by the optimum usage of the islands. This is achieved by island allocation rules to take advantage of non-magnetic island. The island allocation also provides for easier lift-off. Logic is used to encode and decode the Gray code. Further, the Gray code is designed to stabilize the magnetic island/non-magnetic island ratio to allow for easier manufacture.

10 Claims, 13 Drawing Sheets

U.S. PATENT DOCUMENTS

| | | |
|---|---|---|
| 6,226,138 B1 | 5/2001 | Blaum et al. |
| 6,345,021 B1 | 2/2002 | Belser et al. |
| 6,345,074 B1 * | 2/2002 | Turk et al. .................. 375/341 |
| 6,424,479 B1 | 7/2002 | Hayashi |
| 6,480,984 B1 | 11/2002 | Aziz |
| 6,590,728 B1 | 7/2003 | Yang |
| 6,600,620 B1 | 7/2003 | Krounbi et al. |
| 6,603,622 B1 | 8/2003 | Christiansen et al. |
| 6,614,608 B1 | 9/2003 | Belser et al. |
| 6,657,800 B1 | 12/2003 | Ozdemir et al. |
| 6,754,016 B2 | 6/2004 | Messner et al. |
| 6,922,297 B2 | 7/2005 | Kirby |
| 6,947,235 B2 | 9/2005 | Albrecht et al. |
| 7,026,965 B1 * | 4/2006 | Wu .............................. 341/98 |
| 7,126,775 B1 * | 10/2006 | Zook ........................... 360/49 |
| 2006/0109579 A1 * | 5/2006 | Asakura et al. ............... 360/49 |
| 2006/0132953 A1 * | 6/2006 | Asakura et al. ............... 360/48 |

OTHER PUBLICATIONS

Tanaka et al., "Characterization of Magnetizing Process for Pre-Embossed Servo Pattern of Plastic Hard Disks," IEEE Trans. MAG 30, No. 6, Nov. 1994.

R. L. White et al., "Patterned Media: A Viable Route to 50 Gbit/in2 and Up for Magnetic Recording?," IEEE Trans. MAG 33, No. 1, Jan. 1997, pp. 990-995.

* cited by examiner

SERVO PATTERNS FOR PATTERNED MEDIA

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head is generally an inductive write element that includes an electrically conductive coil that generates a magnetic flux in a write pole. The read head includes a magnetoresistive sensor. In current read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer.

Patterned magnetic recording media have been proposed to increase the bit density in magnetic recording data storage, such as hard disk drives. Patterned media can also be used for magnetic tape and other recording media such as compact disks. In magnetic patterned media, the magnetic material is patterned into small magnetically isolated blocks or islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording", IEEE Transactions on Magnetics, Vol. 33, No. 1, Jan 1997, 990-995.

In perpendicular patterned media applications, typically a magnetization in the up direction is considered North (N) and magnetization in the down direction is considered South (S). For longitudinal patterned media, magnetization in the left direction would be considered West (W) and magnetization in the right direction would be considered East (E).

Servo field are also typically used in hard disk drives to help the head stay aligned and to find the proper track. The servo field typically includes a sync field, an STM field, a cylinder ID field and a burst pattern. A sync field is generally used to synchronize data frequency. The STM field, otherwise called the servo start mark, is general used to mark the beginning of the servo information. The cylinder ID field is used to number the tracks and can also include the sector ID number. The burst pattern is used to properly position a head over a track.

SUMMARY OF THE INVENTION

Described are servo patterns, including the STM and cylinder ID fields, for a patterned magnetic recording disk. Principles can also be applied to non-magnetic disks. The servo pattern is imprinted onto the disk in magnetic and non-magnetic islands. After imprinting, the magnetic islands are then magnetized to particular polarities.

The servo pattern can include one or two bits of data for each bit of servo data. Additionally, the servo pattern can have a clock bit placed between the data bits at a regular interval.

The servo pattern can also be formed of a Gray code to enhance servo pattern readability. In addition, the Gray code can be balanced so that during imprinting, the servo pattern releases easily from the master. Further, the Gray code can be constructed to have codewords with a limited number of consecutive 0's.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE INVENTION

The following description is of the best embodiments presently contemplated for carrying out this invention. This description is made for the purpose of illustrating the general principles of this invention and is not meant to limit the inventive concepts claimed herein.

Figure 1:
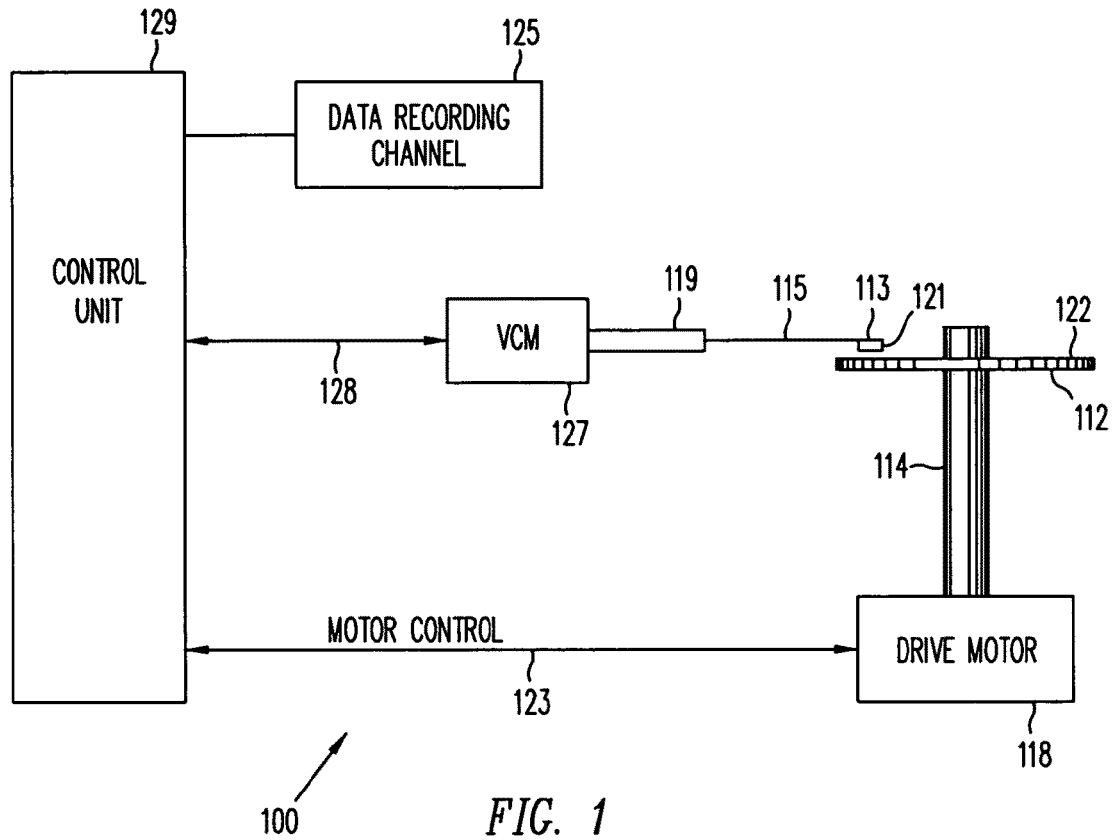
FIG. 1 is a schematic of a hard disk drive.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
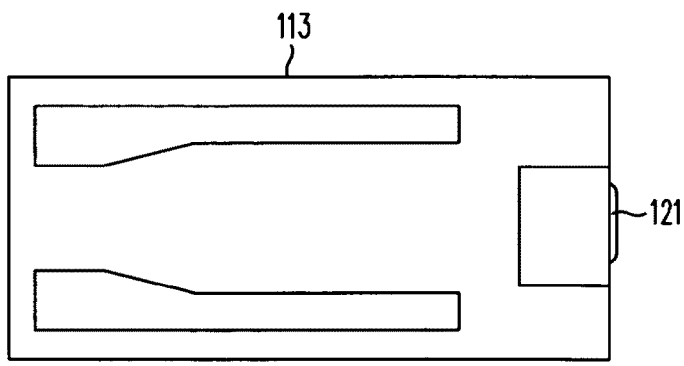
FIG. 2 is a figure of a slider of a hard disk drive.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Servo Pattern with Magnetic and Non-Magnetic Islands

Figure 11:
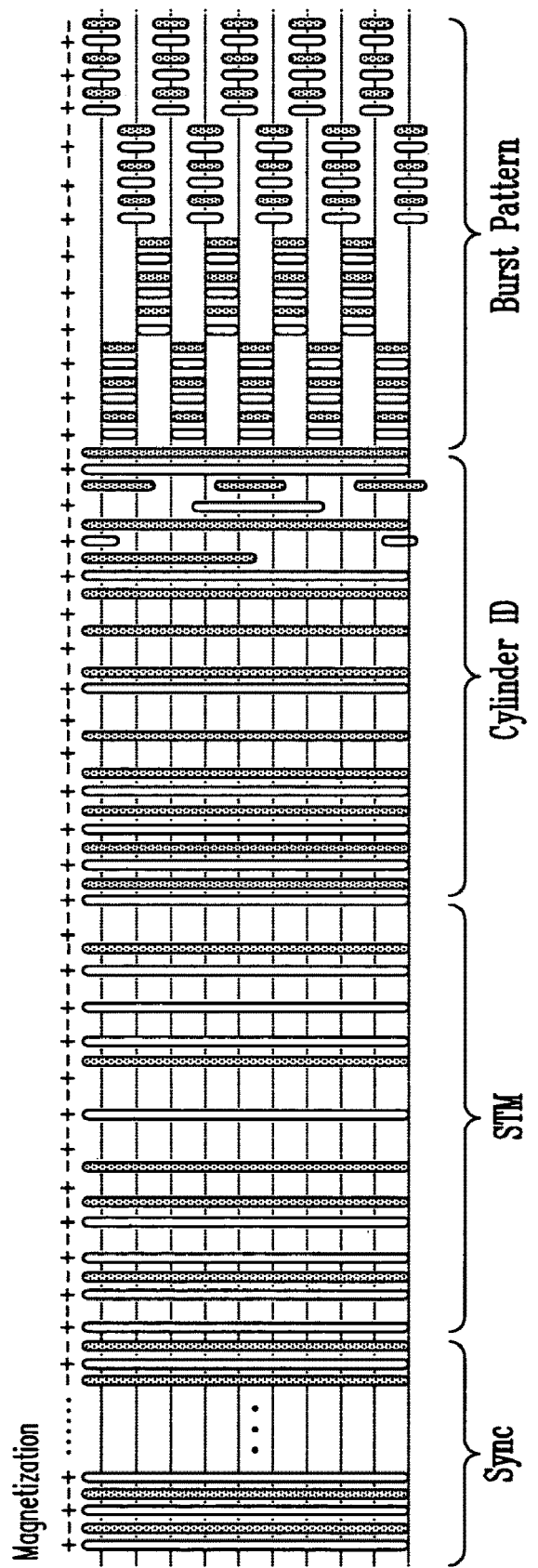
FIG. 11 is a diagram of a servo field of a hard disk drive implemented with a patterned media.

The servo pattern is imprinted on patterned media disk during the manufacture of the disk. FIG. 11 is a diagram of a servo field of a hard disk drive implemented on a patterned media. The imprinting and later deposition processes place non-magnetic islands as well as magnetic islands on the patterned media disk. The non-magnetic islands may be islands without magnetic materials or may merely be the smooth surface of the disk with no readable magnetic recording layer beneath. In one possible process, after the imprinting process, magnetic recording layers are added to the disk to magnetize the magnetic islands. After the magnetic recording layers are added, the magnetic islands in the servo pattern are set to either N or S respectively in any of many ways including by a typical write head or a wide write head. If the servo pattern is set to one polarity, the setting may be performed in bulk. The setting of the magnetic islands in the servo pattern can be performed by many entities in the HDD manufacturing chain including a disk manufacturer or an HDD manufacturer before or after the entire HDD is assembled.

Figure 12:
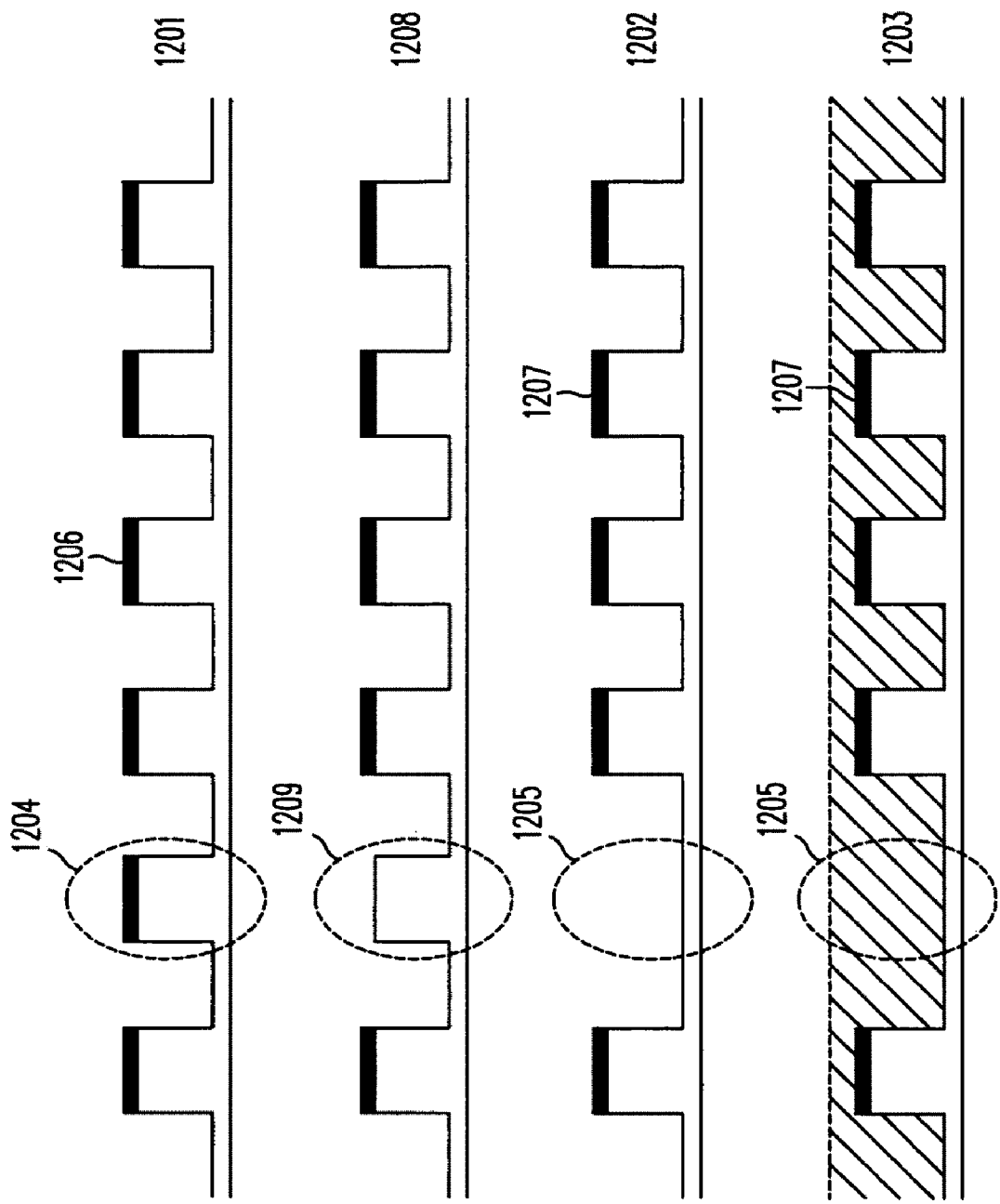
FIG. 12 describes non-magnetic and magnetic islands.

FIG. 12 describes one exemplary embodiment of a patterned media with non-magnetic and magnetic islands. Patterned media 1201 does not include any non-magnetic islands. Specifically, the top of magnetic island 1204 includes a magnetic recording layer. Patterned media 1208 includes non-magnetic island 1209, as non-magnetic island 1209 does not include a magnetic record layer. Patterned media 1202 includes a non-magnetic island 1205 and magnetic island 1207. Further other materials, preferably non-magnetic and including an overcoat and a lubricant are used to cover patterned media 1202 to obtain patterned media 1203. Such materials may also be placed onto patterned media 1208. Thus, in patterned media 1203, the non-magnetic island 1205 is effectively an area without a magnetic recording layer.

The patterned media described above may be made by depositing magnetic materials on the top of islands (topographic process). Patterned media may also be made by depositing a continuous film of magnetic material on a planar surface and then selectively etching away part of the film by ion milling or reverse ion etching to leave isolated magnetic islands (subtractive processes). In either case, the non-magnetic island is as area without a magnetic recording layer in a location where an island with a magnetic recording layer would be logically located. Further, the non-magnetic island is meant to encode digital data. A non-magnetic island is generally, but not necessarily, the same size as a magnetic island.

Figure 14:
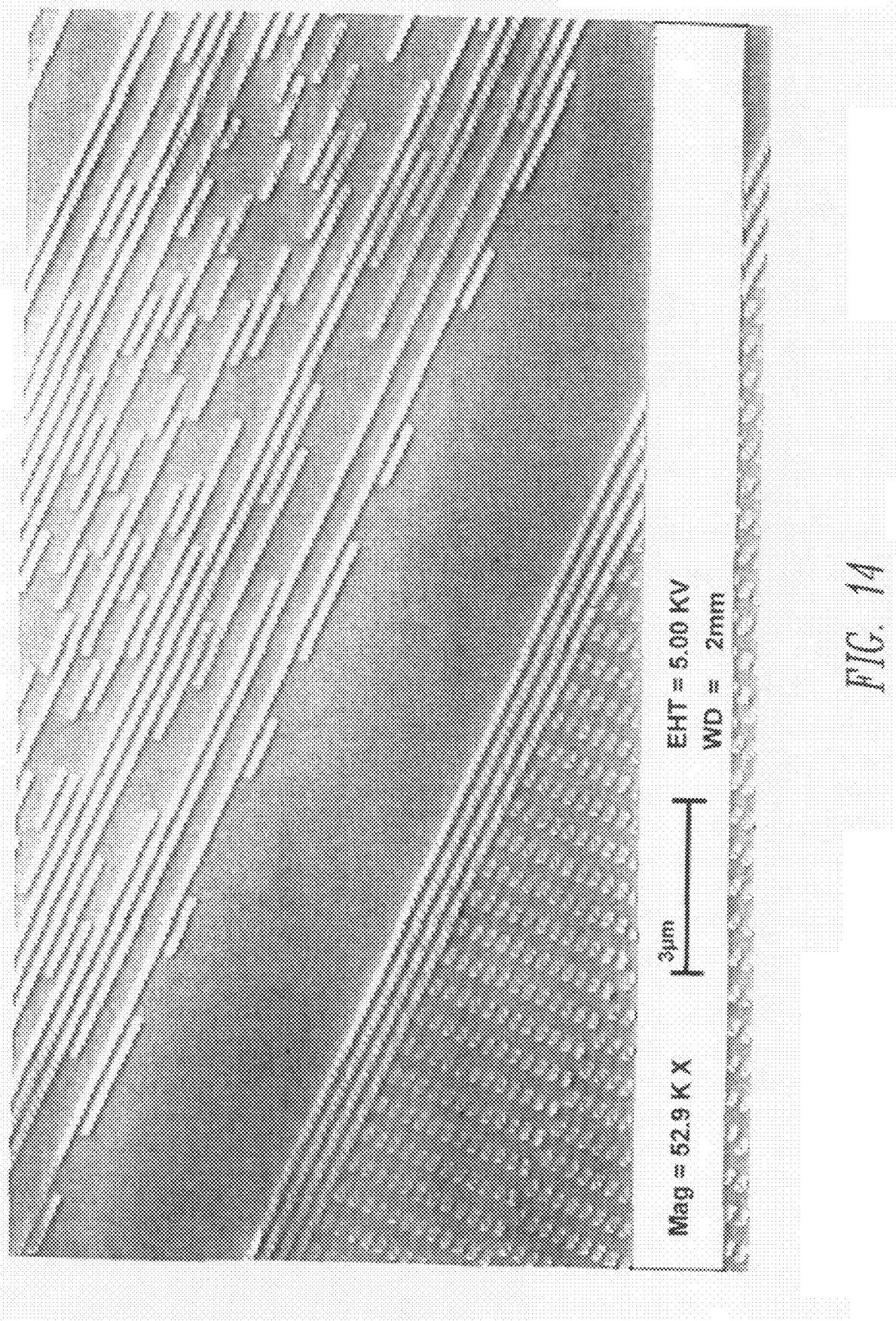
FIG. 14 is a picture of a servo pattern.

The island shape for the sync, STM and CylinderID may be rectangular. The rectangular length of these islands could extend in a radial direction all the way from the inside diameter to the outside diameter for the sync pattern as shown in FIG. 14. For the Cylinder ID, the rectangular islands could extend in a radial direction beyond the track width if the bit is the same as the adjacent track. Further these islands could be individual bits or individually vertically/multilevel stacked bits (as described in U.S. Pat. No. 6,947,235).

Figure 3A:
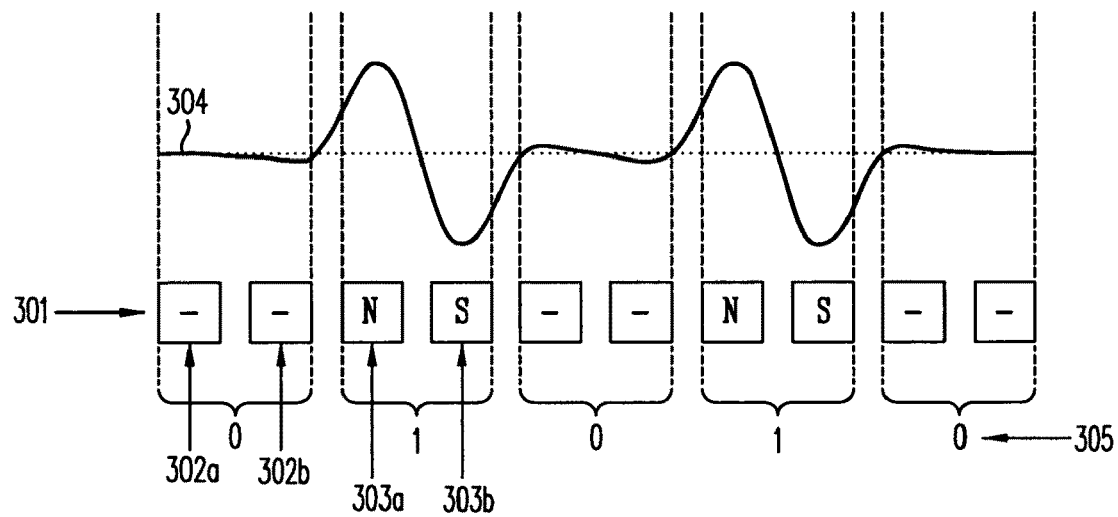
FIG. 3a is an embodiment of a servo pattern that includes two islands per encoded servo bit.

FIG. 3a describes a first embodiment of a servo pattern that includes two islands per encoded servo bit of the servo pattern. This leads to a 50% efficiency for encoding a servo pattern. Islands 301 are either nonmagnetic (denoted by "-") or magnetic (denoted by N or S). Two non-magnetic islands, such as 302a and 302b, denoted—and—encode a 0 in the servo pattern. Two magnetic islands, such as 303a and 303b, denoted by N and S encode a 1 in the servo pattern. Thus, the ten islands —NS—NS— 301 in FIG. 3a encodes the servo bit pattern 01010 305. Alternation of the N and S magnetizations allows for a read head to more easily differentiate the magnetics of each individual island. The signal read by the read head is curve 304.

Figure 3B:
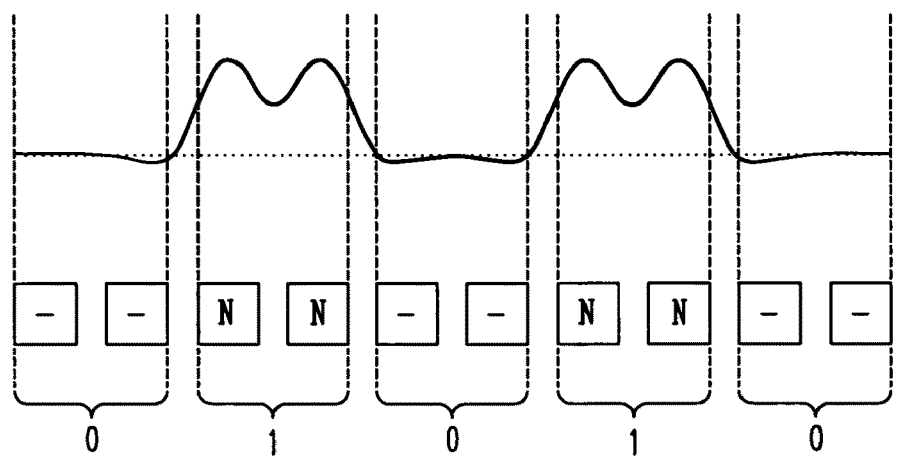
FIG. 3b is an embodiment of a servo pattern that includes two islands per encoded servo bit and a single polarity of magnetization.

A first alternate implementation for the two islands per encoded bit servo pattern includes using only N or only S to magnetize the magnetic islands, as described for the N case in FIG. 3b. Thus a—and—would encode a 0 and an N and N would encode a 1. Alternatively, a—and—could encode a 1 and an N and N would encode a 0. A second alternate implementation is where any combination of two islands can be used to encode a servo bit. Thus a—and S could encode a 1 and an N and—could encode a 0. These two alternate implementations could be combined where a—and N would encode a 0 and an N and—would encode a 1.

Figure 4A:
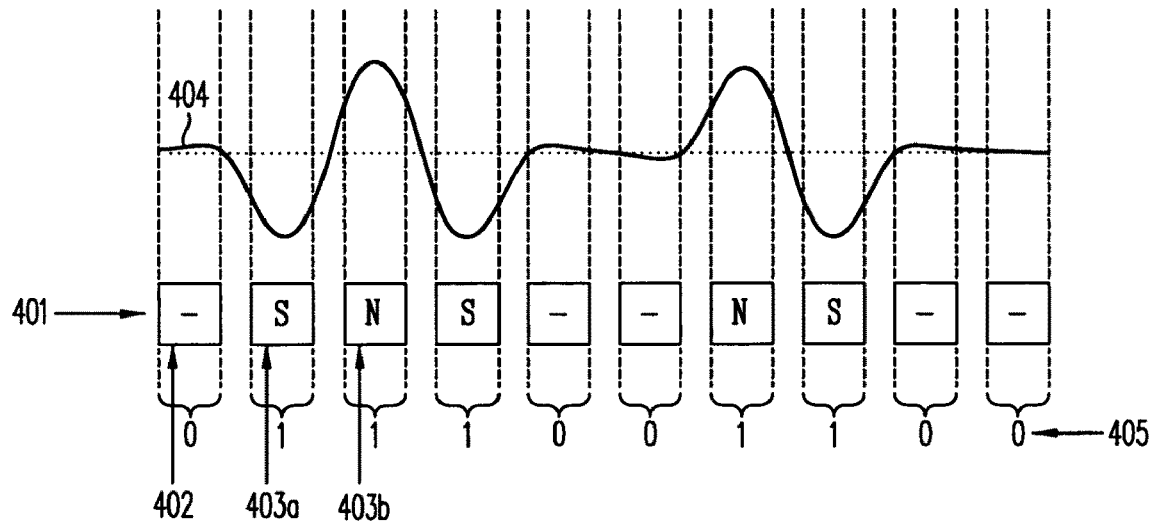
FIG. 4a is an embodiment of a servo pattern that includes one island per encoded servo bit.
Figure 4B:
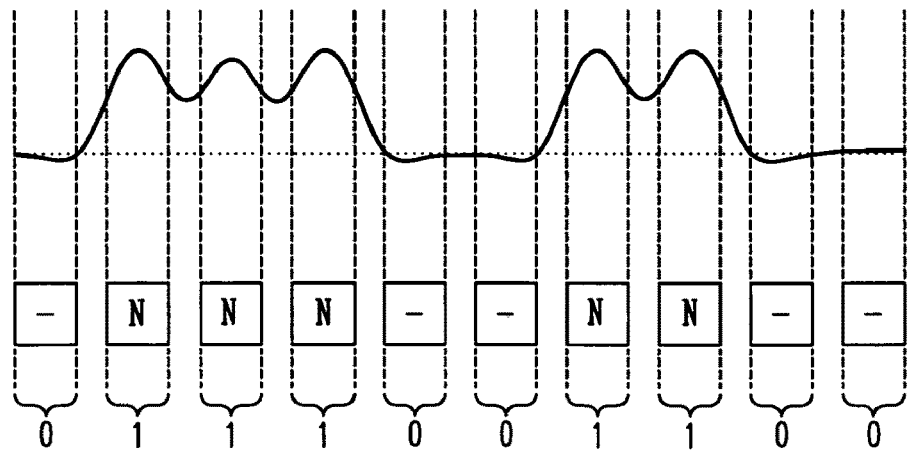
FIG. 4b is an embodiment of a servo pattern that includes one island per encoded servo bit and a single polarity of magnetization.

FIG. 4a describes a second embodiment of a servo pattern that includes one island per encoded servo bit. This leads to a 100% efficiency in encoding a servo pattern. The islands 401 are either nonmagnetic (denoted by "-") or magnetic (denoted by N or S). A nonmagnetic island, such as 402, encodes a 0 and a magnetic island, such as 403a or 403b, encodes a 1 as the servo bit. Thus the ten islands —SNS—NS— in FIG. 4a encodes the servo bit pattern 0111001100 405. Alternatively, a non-magnetic island could encode a 1 and a magnetic island could encode a 0. Again, alteration of the N and S magnetizations allows for a read head to more easily differentiate the magnetics of each individual island. The signal read by the read head is curve 404. Of course, S or N magnetizations could be used to encode a 0. FIG. 4b shows an alternative embodiment where only N magnetized islands are used. In this embodiment, an N encodes a 1 and a non-magnetic island encodes a 0 as the servo bit. In addition only S magnetized islands can be used.

Figure 5A:
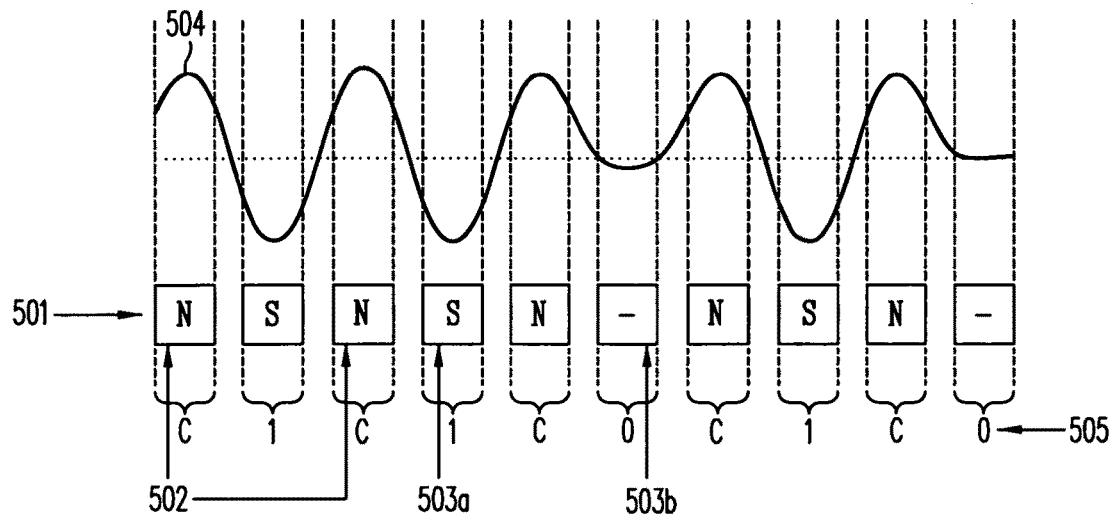
FIG. 5a is an embodiment of a servo pattern that includes one island per encoded servo bit and a clock bit interspersed between each servo bit.
Figure 5B:
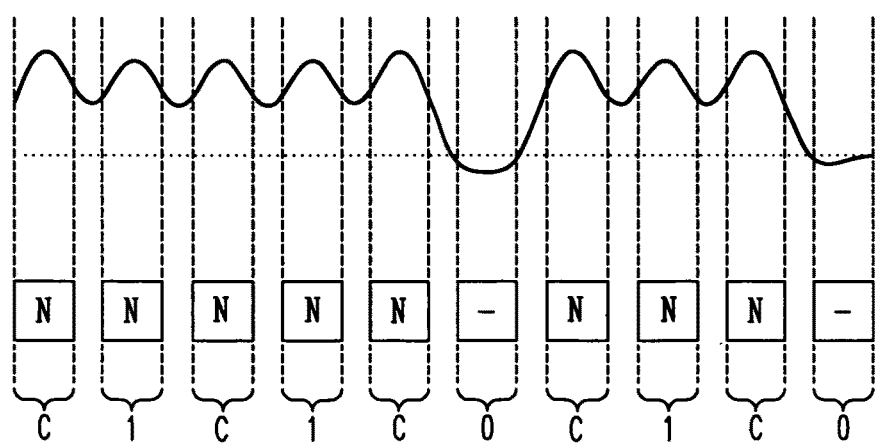
FIG. 5b is an embodiment of a servo pattern that includes one island per encoded servo bit and a clock bit interspersed between each servo bit and a single polarity of magnetization.

FIG. 5a describes a third embodiment of a servo pattern that includes one island per encoded servo bit and a clock bit between each encoded servo bit. This leads to a 50% efficiency in encoding a servo pattern. The clock bit, such as 502 is used to keep the servo pattern readable by a read head and to allow the electronics to ensure that the proper servo code is read. The clock bit is used between each servo bit. The clock bits are all magnetic N. The servo data bits are either magnetic S, such as 503a, or nonmagnetic (denoted by "-"), such as 503b. The magnetic servo data bit encodes a 1 and the non-magnetic bit encodes a 0. Thus the ten islands NSNSN-NSN-501 in FIG. 5a encodes the servo bit pattern 11010 505. Alternatively as described in FIG. 5b, all of the magnetic islands could be all N, all S or random. In addition, the magnetic islands could encode a 0 and the non-magnetic islands could encode a 1 as the servo bit.

Further, since the clock bit is a magnetic island, at least 50% of the islands in the servo pattern will be magnetic in this scheme. Also, at least every other island will be a magnetic island.

Figure 6A:
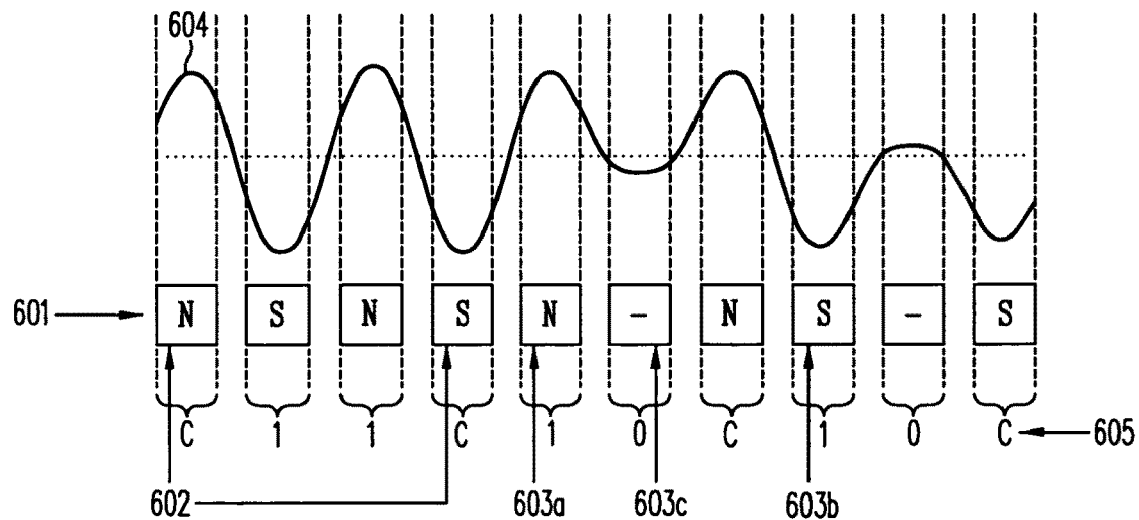
FIG. 6a is an embodiment of a servo pattern that includes one island per encoded servo bit and a clock bit interspersed between each two servo bits.
Figure 6B:
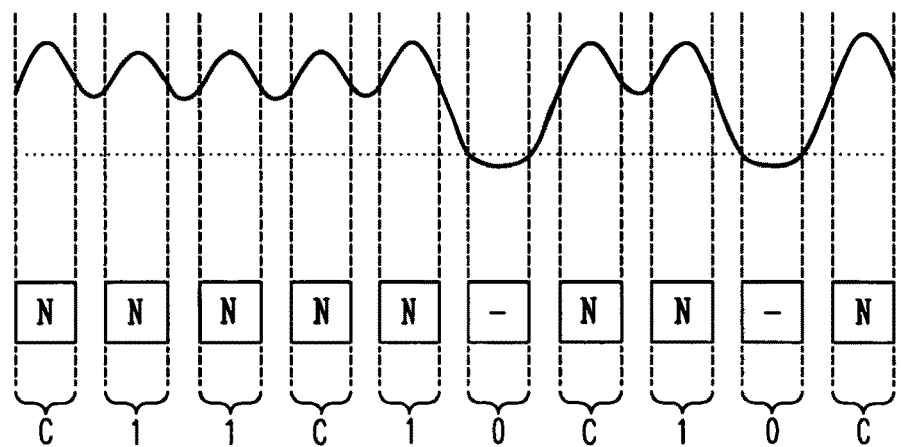
FIG. 6b is an embodiment of a servo pattern that includes one island per encoded servo bit and a clock bit interspersed between each two servo bits and a single polarity of magnetization.

FIG. 6a describes a fourth embodiment of the servo pattern that includes one island per encoded servo bit and a clock bit between each two encoded servo bit. This leads to a servo pattern with a 67% efficiency. However, in general, any number of encoded servo bits can be inserted between each clock bit to create a clock bit that is present at a given interval (the interval need not be constant, but should be known to the circuitry reading the servo pattern). The clock bit, such as 602 is a magnetic island. Since the clock bit repeats in an odd number, the clock alternates between N and S. The servo bits are either magnetic islands or non-magnetic islands. A magnetic island 603a encodes a 1 and a nonmagnetic island 603c encodes a 0 as the servo bit. The magnetic islands are magnetized in such a way as to maintain an N/S alternation for ease of recognition by the read head. Thus, magnetic island 603a is magnetized in the N directions and magnetic island 603b is magnetized in the S direction. The signal read by the read head is curve 604. Thus the ten islands NSNSN-NS-S 601 in FIG. 6a encodes the bit pattern 111010 605 with a spare clock bit. Alternatively, all of the magnetic islands can be magnetized all in the same direction, as described in FIG. 6b, or random directions. The concept of FIG. 3 can be implemented with the concepts of FIGS. 5 and 6, such that each servo bit is encoded by two islands.

Further, since the clock bit is a magnetic island, at least 33% of the islands in the servo pattern will be magnetic in this scheme. Also, at least every third island will be a magnetic island.

The embodiments above described an implementation for perpendicular patterned media. If the perpendicular magnetizations were altered to longitudinal magnetizations then the servo patterns described above can be used with longitudinal patterned media. For example, N magnetic islands can be magnetized as E and S magnetic islands can be magnetized as W. Then E magnetic islands are treated as N and W magnetic islands are treated as S.

Gray Codes

Gray codes can be used to provide for robust servo patterns. They allow for orderings where adjacent numbers only differ by a single bit. Gray codes can be used to enhance the servo pattern schemes using magnetic and non-magnetic schemes described above.

The servo data can be encoded by a Gray code scheme prior to being placed on a patterned media recording disk. For instance the following Gray code encoding schemes can be used. These Gray codes provide for a run of no more than two zeros.

1/1 Gray Code Encoding Formula $$u_0 = a_0$$

2/3 Gray Code Encoding Formula $$u_0 = a_0$$
$$u_1 = 1$$
$$u_2 = a_0 \oplus a_1$$

3/4 Gray Code Encoding Formula $$u_0 = \overline{a_0 \overline{a_1}}$$
$$u_1 = \overline{a_0 \overline{a_1} \overline{a_2}}$$
$$u_2 = \overline{a_0 a_1 a_2} \oplus \overline{a_0 \overline{a_1} \overline{a_2}}$$
$$u_3 = \overline{a_0 \overline{a_1} \overline{a_2}} \oplus \overline{a_0 a_1}$$

4/5 Gray Code Encoding Formula $$u_0 = f_0(a_0, a_1, a_2, a_3) = \overline{a_0(a_1 \oplus a_2)} \oplus \overline{a_0 a_1 \overline{a_2}}$$
$$u_1 = f_1(a_0, a_1, a_2, a_3) = \overline{a_0 \overline{a_1} \overline{a_2} \overline{a_3}} \oplus \overline{a_0(\overline{a_1} \overline{a_2} \overline{a_3} \oplus a_1 a_2 a_3)}$$
$$u_2 = f_2(a_0, a_1, a_2, a_3) = \overline{\overline{a_0} \overline{a_1} \oplus a_0 a_1 \overline{a_2} \overline{a_3}}$$
$$u_3 = f_3(a_0, a_1, a_2, a_3) = \overline{\overline{a_1}(\overline{a_0} a_2 a_3 \oplus a_0 \overline{a_2} \overline{a_3}) \oplus \overline{a_0} a_1 \overline{(a_2 \oplus a_3)}}$$
$$u_4 = f_4(a_0, a_1, a_2, a_3) = \overline{a_0} \oplus a_0 \overline{a_1} \overline{a_2}$$

In addition, any larger Gray code formula can be created by appending any of the four Gray code formulas describe above. Examples of such appending are in Table 1.

TABLE 1

| 4/5 Encoding Formula Only | 4/5 + 1/1 Encoding Formula | 4/5 + 2/3 Encoding Formula | 4/5 + 3/4 Encoding Formula |
|---|---|---|---|
| 4/5 | 5/6 | 6/8 | 7/9 |
| 8/10 | 9/11 | 10/13 | 11/14 |
| 12/15 | 13/16 | 14/18 | 15/19 |
| 16/20 | 17/21 | 18/23 | 19/24 |
| 20/25 | 21/26 | 22/28 | 23/29 |
| 24/30 | 25/31 | 26/33 | 27/34 |

An example of such a Gray code is an 8/10 Gray code. The encoding of the 8/10 Gray code is a follows.

$$u_0 = \overline{\overline{a_0}(a_1 \oplus a_2) \oplus a_0 a_1 \overline{a_2}}$$

$$u_1 = \overline{\overline{a_0}\overline{a_1}\overline{a_2}\overline{a_3} \oplus a_0(\overline{a_1}\overline{a_2}\overline{a_3} \oplus a_1 a_2 a_3)}$$

$$u_2 = \overline{\overline{a_0}\overline{a_1} \oplus a_0 a_1 \overline{\overline{a_2}\overline{a_3}}}$$

$$u_3 = \overline{a_1}(\overline{a_0}a_2 a_3 \oplus a_0 \overline{a_2}\overline{a_3}) \oplus \overline{a_0}a_1 \overline{a_2 \oplus \overline{a_3}}$$

$$u_4 = \overline{a_0} \oplus a_0 \overline{a_1}\overline{a_2}$$

$$u_5 = \overline{\overline{a_3}(\overline{a_4}a_5 \oplus a_6) \oplus a_4 a_5 \overline{a_6}) \oplus \overline{a_3(a_4 \overline{a_5} \oplus \overline{a_6}) \oplus \overline{a_4}\overline{a_5}a_6)}}$$

$$u_6 = \overline{\overline{a_3}(\overline{a_4}\overline{a_5}\overline{a_6}\overline{a_7} \oplus a_4(\overline{a_5}\overline{a_6}\overline{a_7} \oplus a_5 a_6 a_7)) \oplus}$$
$$\overline{a_3(a_4 a_5 a_6 a_7 \oplus \overline{a_4}(a_5 \overline{a_6}\overline{a_7} \oplus \overline{a_5}a_6 \overline{a_7}))}$$

$$u_7 = \overline{\overline{a_3}(\overline{a_4}\overline{a_5} \oplus a_4 a_5 \overline{\overline{a_6}\overline{a_9}}) \oplus a_3 \overline{(a_4 a_5 \oplus \overline{a_4}\overline{a_5}\overline{a_6 a_9})}}$$

$$u_8 = \overline{\overline{a_3}(\overline{a_5}(\overline{a_4}a_6 a_7 \oplus a_4 \overline{a_6}\overline{a_7}) \oplus \overline{a_4}a_5 \overline{a_6 \oplus \overline{a_7}}) \oplus}$$
$$\overline{a_3(a_5(a_4 \overline{a_6}\overline{a_7} \oplus \overline{a_4}a_6 a_7) \oplus a_4 \overline{a_5}\overline{a_6} \oplus \overline{a_7}))}$$

$$u_9 = \overline{a_3}(\overline{a_4} \oplus a_4 \overline{a_5}\overline{a_7}) \oplus a_3(a_4 \oplus \overline{a_4}a_5 a_7)$$

Upon being read by the head, electronics in the HDD can decode the Gray codes with the following decode formulas.

1/1 Gray Code Decoding Formula $$a_0 = u_0$$

2/3 Gray Code Decoding Formula $$a_0 = u_0$$
$$a_1 = u_0 \oplus u_2$$

3/4 Gray Code Decoding Formula $$a_0 = u_0(\overline{u}_1 u_3 \oplus u_2 \overline{u}_3)$$
$$a_1 = u_0(u_1 \oplus \overline{u}_1 \overline{u}_3)$$
$$a_2 = u_0 \overline{(u_1 \oplus u_2)} \oplus u_3$$

4/5 Gray Code Decoding Formula $$a_0 = g_0(u_0, u_1, u_2, u_3, u_4) = \overline{u_4 \overline{u_0}\overline{u_1}u_2}$$
$$a_1 = g_1(u_0, u_1, u_2, u_3, u_4) = u_1 u_2 u_4 \oplus \overline{u}_4 \overline{u_0 u_2 u_3}$$

$$a_2 = g_2(u_0, u_1, u_2, u_3, u_4) = u_0 u_3 \overline{u}_4 \oplus u_1 u_4 \overline{(u_0 \oplus u_2)}$$
$$a_3 = g_3(u_0, u_1, u_2, u_3, u_4) =$$
$$u_4(u_1 \overline{(u_0 \oplus u_2 \oplus u_3)} \oplus \overline{u}_1 u_0 u_2 u_3) \oplus \overline{u}_4 u_3(u_0 \oplus u_1 \oplus u_2)$$

8/10 Gray Code Decoding Formula $$a_0 = g_0(u_0, u_1, u_2, u_3, u_4) = \overline{u_4 \overline{u_0}\overline{u_1}u_2}$$
$$a_1 = g_1(u_0, u_1, u_2, u_3, u_4) = u_1 u_2 u_4 \oplus \overline{u}_4 \overline{u_0 u_2 u_3}$$
$$a_2 = g_2(u_0, u_1, u_2, u_3, u_4) = u_0 u_3 \overline{u}_4 \oplus u_1 u_4 \overline{(u_0 \oplus u_2)}$$
$$a_3 = g_3(u_0, u_1, u_2, u_3, u_4) =$$
$$u_4(u_1 \overline{(u_0 \oplus u_2 \oplus u_3)} \oplus \overline{u}_1 u_0 u_2 u_3) \oplus \overline{u}_4 u_3(u_0 \oplus u_1 \oplus u_2)$$
$$a_4 = a_3 \oplus g_0(u_5, u_6, u_7, u_8, u_9) = a_3 \oplus \overline{u_9 \overline{u_5}\overline{u_6}u_7}$$
$$a_5 = a_3 \oplus g_1(u_5, u_6, u_7, u_8, u_9) = a_3 \oplus u_6 u_7 u_9 \oplus \overline{u}_9 \overline{u_5 u_7 u_8}$$
$$a_6 = a_3 \oplus g_2(u_5, u_6, u_7, u_8, u_9) = a_3 \oplus u_5 u_8 \overline{u}_9 \oplus u_6 u_9 \overline{(u_5 \oplus u_7)}$$
$$a_7 = a_3 \oplus g_3(u_5, u_6, u_7, u_8, u_9) =$$
$$a_3 \oplus u_9(u_6 \overline{(u_5 \oplus u_7 \oplus u_8)} \oplus \overline{u}_6 u_5 u_7 u_8) \oplus \overline{u}_9 u_8(u_5 \oplus u_6 \oplus u_7)$$

In general the encoding and decoding of can be accomplished using the general formulas described below.

Given two Gray codes U and V, U has $2^{k_1}$ rows of length $n_1$ each and V has $2^{k_2}$ rows of length $n_2$ each. U is a $k_1/n_1$ Gray code and V is a $k_2/n_2$ Gray code. Therefore, the generalized reflective construction G(U,V) gives a $(k_1+k_2)/(n_1+n_2)$ Gray code. Further, the encoding and decoding circuits of U and V are understood. Specifically, given $(a_0, a_1, \ldots, a_{k1-1})$ and $(b_0, b_1, \ldots, b_{k2-1})$ vectors of length $k_1$ and $k_2$ respectively, denote by $F_1 (a_0, a_1, \ldots, a_{k1-1}) = (u_0, u_1, \ldots, u_{n1-1})$ is the encoding circuits for U and by $F_2(b_0, b_1, \ldots, b_{k2-1}) = (v_0, v_1, \ldots, v_{n2-1})$ is the encoding circuits for V. Using $F_1$ and $F_2$, the encoding circuits for G(U,V) is as follows:

$$F(a_0, a_1, \ldots, a_{k_1-1}, a_{k_1}, \ldots, a_{k_1+k_2-1}) = F_1(a_0, a_1, \ldots, a_{k_1-1}), \overline{a}_{k_1-1} F_2(a_{k_1}, a_{k_1+1}, \ldots, a_{k_1+k_2-1}) \oplus a_{k_1-1} F_2(\overline{a}_{k_1}, \overline{a}_{k_1+1}, \ldots, \overline{a}_{k_1+k_2-1})$$

$F_1^{-1}(u_0, u_1, \ldots, u_{n1-1}) = (a_0, a_1, \ldots, a_{k1-1})$ denotes the decoding circuits for U and $F_2^{-1}(u_{n1}, u_{n1+1}, \ldots, u_{n1+n2-1}) = (a_{k1}, a_{k1+1}, \ldots, a_{k1+k2-1})$ denotes the decoding circuits for V. Based on the above formula for encoding, the decoding circuits for G(U,V) are:

$$F^{-1}(u_0, u_1, \ldots, u_{n_1-1}, u_{n_1}, \ldots, u_{n_1+n_2-1}) = F_1^{-1}(u_0, u_1, \ldots, u_{n_1-1}),$$
$$\left(\overline{\underbrace{(a_{k_1-1}, a_{k_1-1}, \ldots, a_{k_1-1})}_{n_2}} \oplus F_2^{-1}(u_{n_1}, u_{n_1+1}, \ldots, u_{n_1+n_2-1})\right)$$
$$= (a_0, a_1, \ldots, a_{k_1-1}, a_{k_1-1} \oplus a_{k_1},$$
$$a_{k_1-1} \oplus a_{k_1+1}, \ldots,$$
$$a_{k_1-1} \oplus a_{k_1+k_2-1})$$

Figure 7:
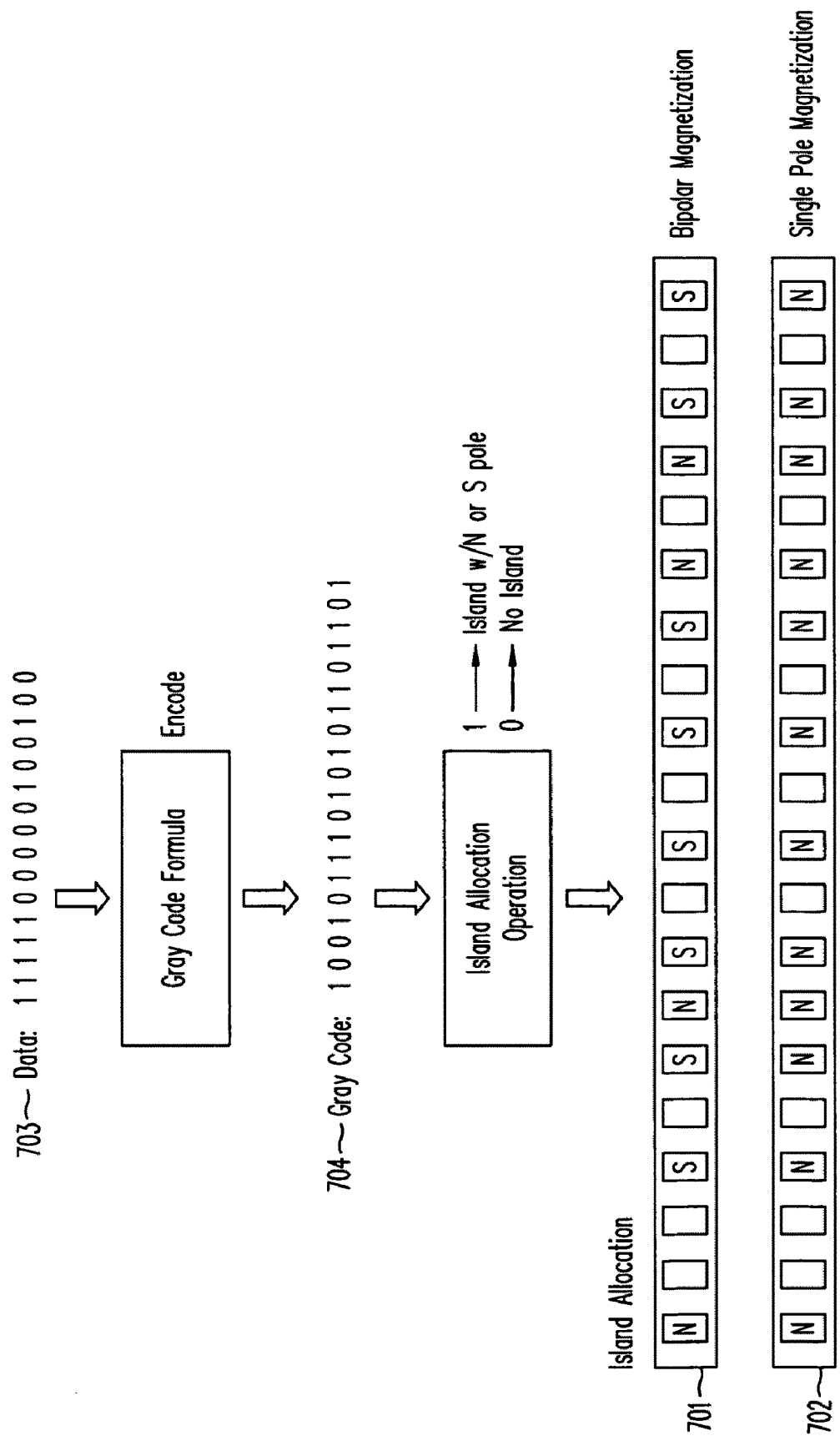
FIG. 7 is a diagram of encoding a servo pattern onto a patterned media disk with a Gray code.

FIG. 7 is an example of encoding data in a 16/20 Gray code. The 16 bits of data 703 are encoded into 20 bits of Gray code data 704 with use of the formulas described above. The Gray code data is then used as the servo pattern/servo bits. The patterned media servo bits 701 are shown using an alternating magnetic polarization scheme. The patterned media servo bits 702 are shown using a single magnetic polarization scheme. In these schemes, magnetic islands encode a 1 and non-magnetic islands encode a 0. Here, the data 1111100000100100 is encoded in a Gray code as 10010111010101101101.

Figure 8:
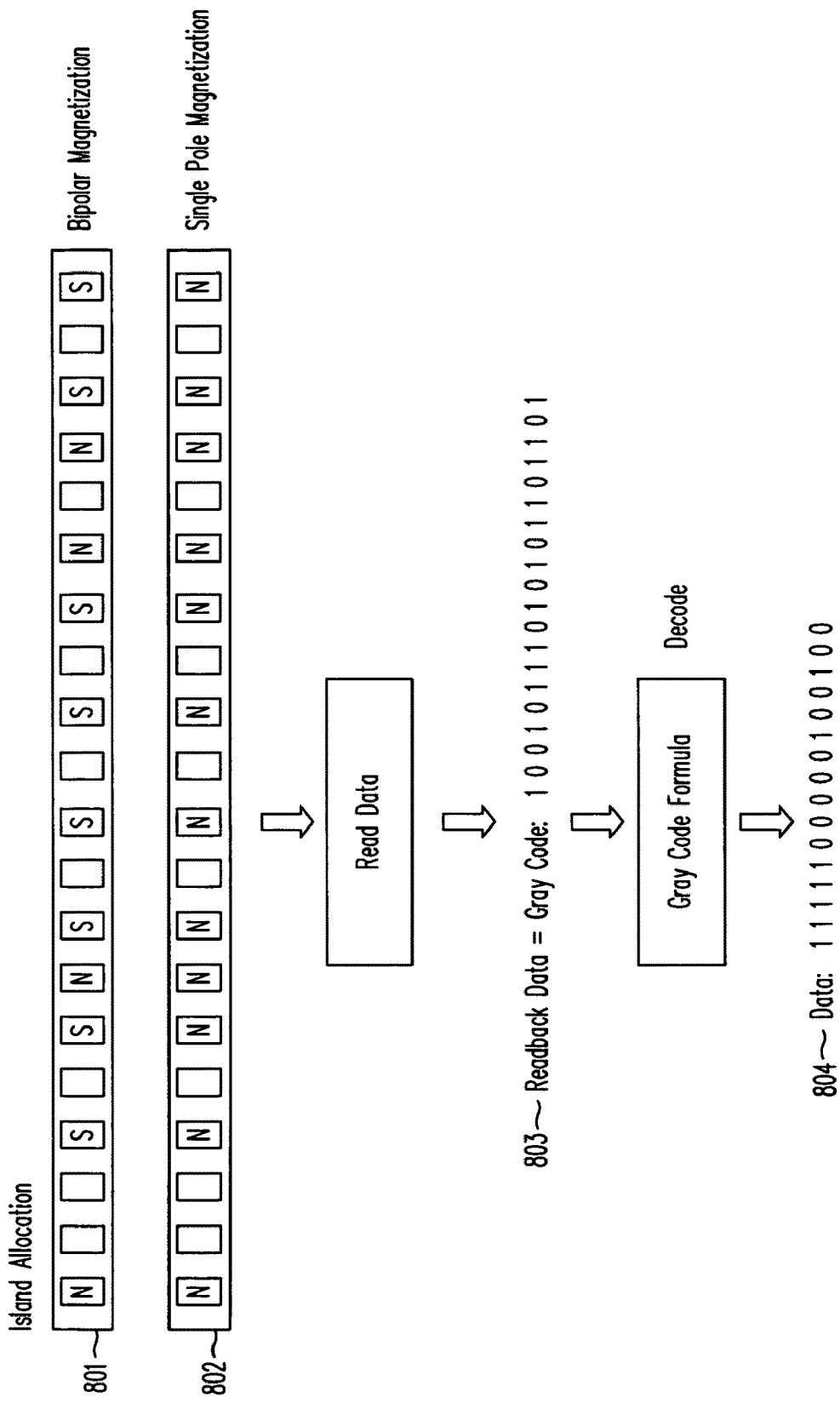
FIG. 8 is a diagram of decoding a servo pattern from a patterned media disk with a Gray code.

FIG. 8 is an example of decoding data in a 16/20 Gray code. A read head reads the islands in the servo bit pattern 801 (bipolar magnetization case) or 802 (single pole magnetization case). This data is then transferred to electronic circuitry as the read back data 803. The circuitry then decodes the read back data 803 to obtain the data .804. In FIG. 8 the formulas above are used to decode the read back data Gray code 10010111010101101101 to 1111100000100100.

Figure 9:
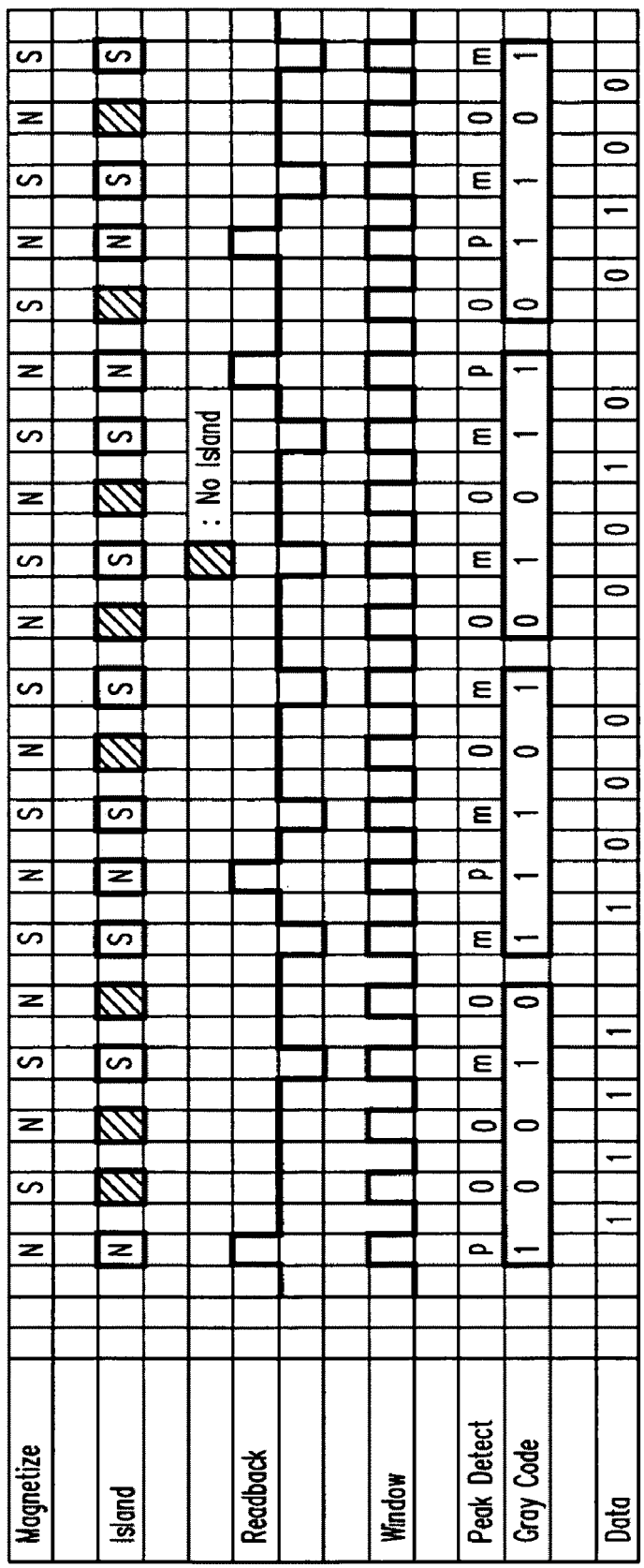
FIG. 9 is a diagram of the readback signal and window a head uses to read the servo pattern using a bipolar magnetization.

FIG. 9 shows the read back signal and window a head could use to read the servo pattern using a bipolar magnetization. The read back signal is read in specific windows. Further, the circuitry can be programmed to expect magnetizations of opposite polarity at given intervals. When read, the signal is converted into the read back data in Gray code format. Electronic circuitry then decodes the read back data in Gray code format into decoded data.

Figure 10:
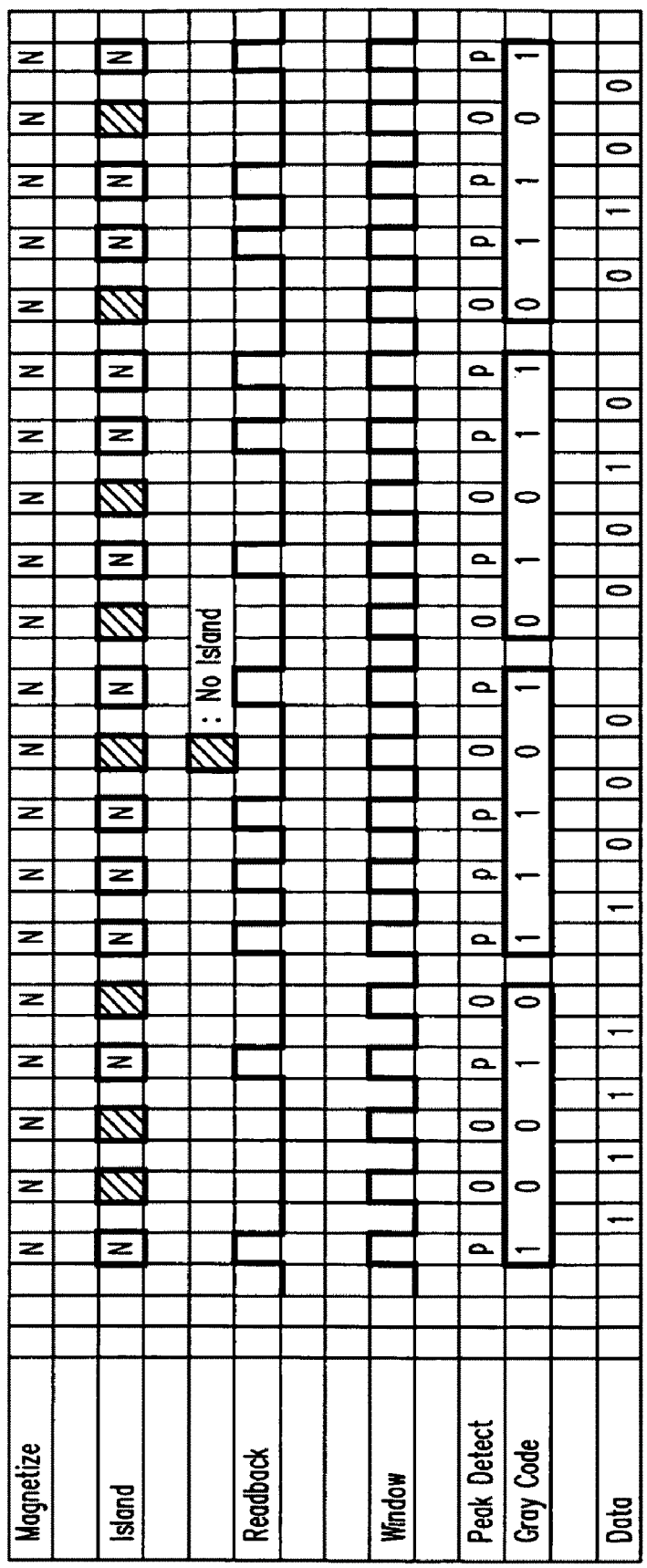
FIG. 10 is a diagram of the readback signal and window a head uses to read the servo pattern using a single polar magnetization.

FIG. 10 shows the read back signal and window a head could use to read the servo pattern using a single pole magnetization. The read back signal is read in specific windows. When read, the signal is converted into the read back data in Gray code format. Electronic circuitry decodes the read back data into decoded data.

In general, clock bits are not encoded with a Gray code.

Balanced Servo

A balanced or constant Gray code can be the Gray code used for the servo field. During a nanoimprinting step a master pattern affects resist flow during nanoimprinting. During nanoimprinting, a liquid photo-curable polymer is placed between the imprint mold (derived from the original e-beam master pattern) and the disk substrate. The resist may be applied as a continuous thin film (for example, by spin coating) or as an array of droplets (for example, by ink jet printing). As the mold is pressed against the disk, the liquid resist flows to conform to the shape of the topographic features on the mold. After pressure has been applied for a short time and the flow has more or less equilibrated, the liquid resist is exposed to intense UV light through the transparent mold. This UV exposure causes the resist to solidify, freezing in a topographic replica of the features on the mold. After exposure, the mold is removed, leaving the resist pattern on the disk surface for subsequent etching (materials are engineered so that the cured resist does not stick to the mold, but does stick to the disk substrate).

As the liquid resist flows during the imprinting process, a so-called "residual layer" is formed. The thickness depends on the amount of resist originally dispensed, the details of the topographic pattern on the mold, the pressure applied during the imprinting process, the viscosity of the resist, and other factors. In general, for patterned media, the mold will have only two levels—the original flat surface level of the mold, and relief features etched into the mold, with all features being of generally similar depth.

In order for the imprinted resist pattern to work well as an RIE etch mask, the residual layer shown above should be thin and uniform over the entire disk surface. If the thickness of the residual layer varies significantly over the disk surface, the RIE process being used to form features on the disk substrate may have nonuniform etch depth and varying lateral dimensions on features as well.

Since the desired residual layer thickness is in the range of 0-25 nm, the resist is being "squeezed" to a very thin layer. Although every attempt is made to reduce the viscosity of the resist to facilitate flow, finite viscosity prevents the resist from flowing over long distances within a reasonable amount of process time (10 seconds would be a typical target time for pressing). Given these constraints, achieving a uniform residual layer thickness depends on at least having a uniform ratio of land versus relief in the mold pattern.

Since the resist will flow over short distances (experimentally we have found that it flows well over distances on the order of 50 or 100 um), it is not necessary that this uniformity extend to the very microscopic level; however, at the 50 or 100 um range and larger, pattern land/relief ratio should be quite uniform, so that resist does not flow over long distances.

The land/relief ratio on the mold is governed by the types of patterns required on the finished disk. The pattern will consist of highly uniform island arrays forming circular tracks, with "sector header" patterns interspersed. Such sector header patterns typically fall within roughly radial spokes, such that every circular track is interrupted on the order of a few hundred places per revolution. While the data island areas are by their nature highly uniform in their land/relief ratio, this is not automatically the case for sector header regions.

The sector header regions contain various types of servo fields including those relating to servo, track ID, sector ID and synchronization. The Gray codes for the servo patterns will consist of a combination of land and relief areas (corresponding to '0' and '1' respectively) which are unique on every track and therefore serve as an ID. Conventional Gray codes do not result in uniform land/relief ratios over large distances. If conventional Gray codes were used, the residual layer would likely show significant long-range nonuniformity due to the inability of the resist to flow over the necessary lengths.

In the Gray code describe in U.S. Pat. No. 6,226,138, incorporated by reference, the Gray code has a relatively equal balance of 0 and 1 values. If the code is implemented topographically such that features fill the entire width of each track on the disk, an equal ratio of 1 and 0 values results in a 50% land/relief ratio, if the width of lands and relief regions is equal. This is good for patterned media. The data regions are likely to be filled with circular or square dots, with a land/relief ratio of 50%. An example would be square islands of 1:1 bit aspect ratio, with each island having a length and width of 71% of the island pitch. Another example with 50% ratio would be circular dots on a square grid, with the diameter of the circle being given by d=p*sqrt(2/p), where p is the grid spacing. One can relax the targeted constraint and achieve target ratios other than 50%, either by changing the ratio of 1 to 0 values in the code, or by changing the ratio of the width of land features to the width of relief features in the topographic realization of the code.

Figure 13:
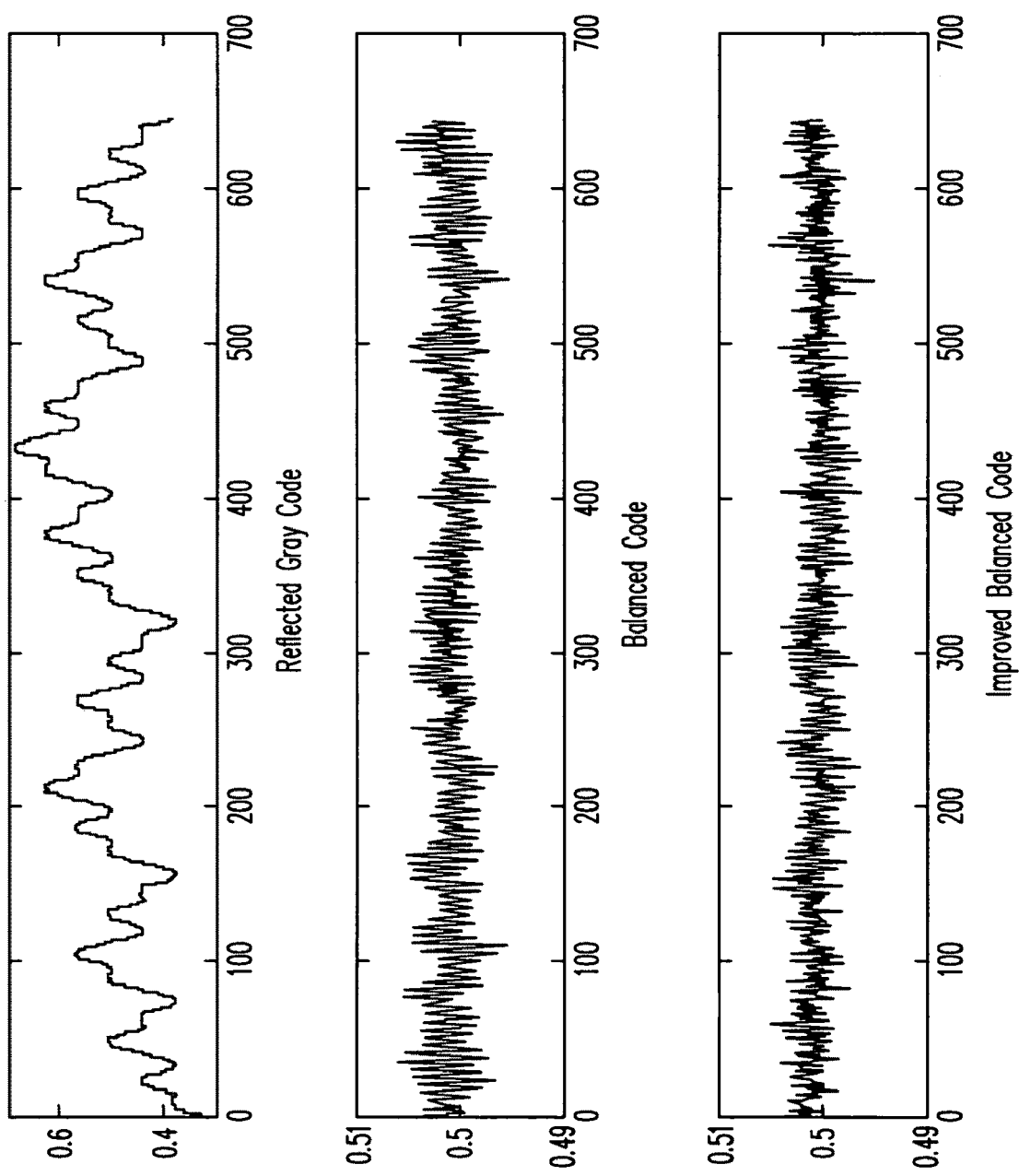
FIG. 13 is a graph of the balance of three Gray codes.

FIG. 13 analyzes the balancing properties of three different Gray codes, where the length of each codeword is 16. The first one is a regular Gray code, the second one is the code constructed as described in U.S. Pat. No. 6,226,138, and the third one is an improved Gray code obtained from combining a regular 8-bit Gray code with an 8-bit code from U.S. Pat. No. 6,226,138. For a window of a length 100 codewords, and each row of the Gray code, the result of the average number of 1 s in the 100 consecutive rows starting from each row appear in the graph of FIG. 13. Regular Gray codes have very bad balancing properties, while the balanced and improved balanced Gray codes keep the average number of is within 49.5% and 50.5%. The window of 100 codewords is given for illustration purposes only. Windows as small as 10 codewords and as large as 3,000 codewords, can be considered for use with servo patterns. Generally the windows will be less than 50 micrometers wide. The graph of FIG. 13 may be repeated for other window lengths but the balancing properties of the codes from U.S. Pat. No. 6,226,138 and from the improved Gray codes are always significantly better than those of regular Gray codes. It is preferable to have a balance ratio between 30-70%, more preferable between 40-60%, even more preferable between 45-55% and further more preferable between 49% and 51%.

Also, a Gray code with a nearly constant or fixed ratio of 0's and 1's over a window is useful since it allows for a relatively uniform amount of resist to be applied during manufacture of a patterned disk. It is preferable to have a difference of 1's and 0's of less than 40%, more preferably less than 20%, even more preferably less than 10% and further more preferable less than 2% over a relevant window.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A patterned media disk including:
    a servo pattern for a cylinder field wherein:
        the servo pattern for the cylinder field is encoded with a Gray code;
        the Gray code is a balanced Gray code with a balance ratio of greater than 30% and less than 70% over a window of 200 codewords; and
        the encoding of the servo pattern for the cylinder field with the Gray code expands the size of the cylinder field of the servo pattern by 50% or less.

2. The patterned media disk of claim 1, wherein the Gray code is a balanced Gray code with a balance ratio of greater than 40% and less than 60% over a window of 200 codewords.

3. The patterned media disk of claim 1, wherein the Gray code is a balanced Gray code with a balance ratio of greater than 45% and less than 55% over a window of 200 codewords.

4. The patterned media disk of claim 1, wherein the Gray code has a difference of 1's and 0's of less than 10% over a window of 200 codewords.

5. The patterned media disk of claim 1, wherein the Gray code has a difference of 1's and 0's of less than 2% over a window of 200 codewords.

6. The patterned media disk of claim 1, wherein the Gray code has a difference of 1's and 0's of less than 10% over a window of between 10 and 30 um.

7. The patterned media disk of claim 1, wherein the Gray code consists of codewords with no more than two consecutive 0's.

8. The patterned media disk of claim 1, wherein the Gray code has a difference of 1's and 0's of less than 5% over a window of 200 codewords.

9. The patterned media disk of claim 1, wherein the encoding of the servo pattern for the cylinder field with the Gray code expands the size of the cylinder field of the servo pattern by 25% or less.

10. The patterned media disk of claim 8, wherein the encoding of the servo pattern for the cylinder field with the Gray code expands the size of the cylinder field of the servo pattern by 25% or less.

* * * * *